United States Patent [19]

Pethers et al.

[11] Patent Number: 4,564,971
[45] Date of Patent: Jan. 21, 1986

[54] WIPER EQUIPMENT

[75] Inventors: Peter C. Pethers, Winkfield; Ivan A. Duck, Chalfont St. Giles; Malcolm A. Carter, Ashford, all of England

[73] Assignee: Trico Products Corporation, Buffalo, N.Y.

[21] Appl. No.: 638,079

[22] Filed: Aug. 6, 1984

[51] Int. Cl.$^4$ .............................................. B60S 1/36
[52] U.S. Cl. ................................................ 15/250.35
[58] Field of Search .................... 15/250.32–250.42

[56] References Cited

U.S. PATENT DOCUMENTS

| 2,295,620 | 9/1942 | Zaiger | 15/250.35 |
| 2,531,889 | 11/1950 | Oishei et al. | 15/250.35 |
| 2,691,790 | 10/1954 | O'Shei | 15/250.35 |
| 3,178,751 | 4/1965 | Wubbe | 15/250.35 |
| 3,405,420 | 10/1968 | Smithers et al. | 15/250.35 |

Primary Examiner—Peter Feldman
Attorney, Agent, or Firm—E. Herbert Liss

[57] ABSTRACT

The need for separately manufactured left-hand and right-hand wiper arms, when a bend is provided along the length of the wiper arms, is avoided by enabling an inner end of a bar portion to be removed from a retainer portion, rotated through a half turn about the longitudinal center line of the inner end, and detachably reassembled with the retainer portion, and by enabling an arm termination to be removed from an outer end of the bar portion, rotated through a half turn about the longitudinal center line of the outer end, and detachably reassembled with the bar portion.

6 Claims, 5 Drawing Figures

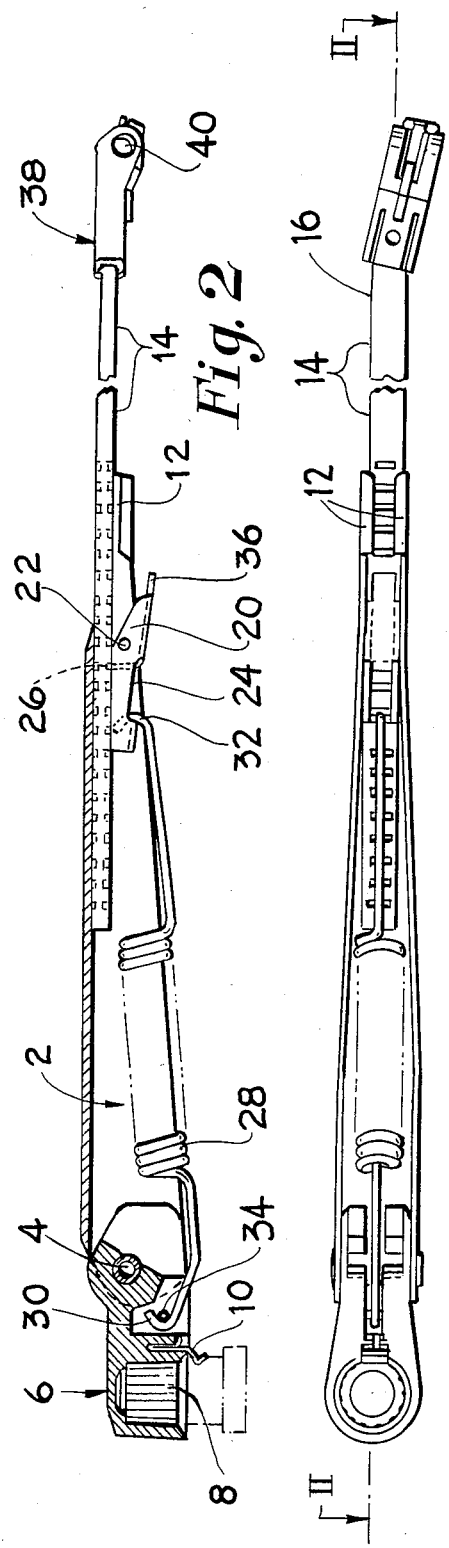
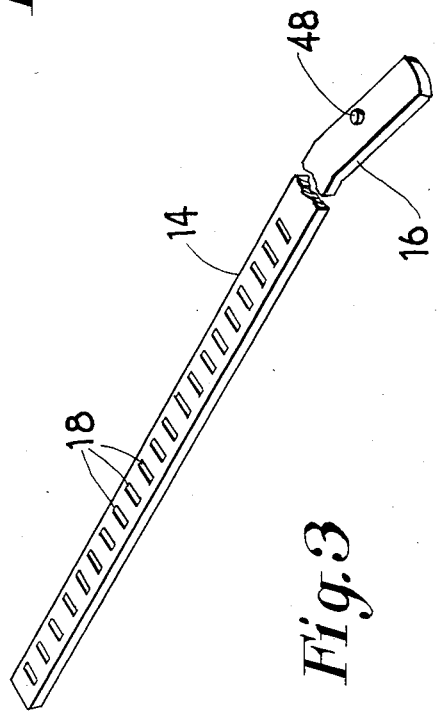

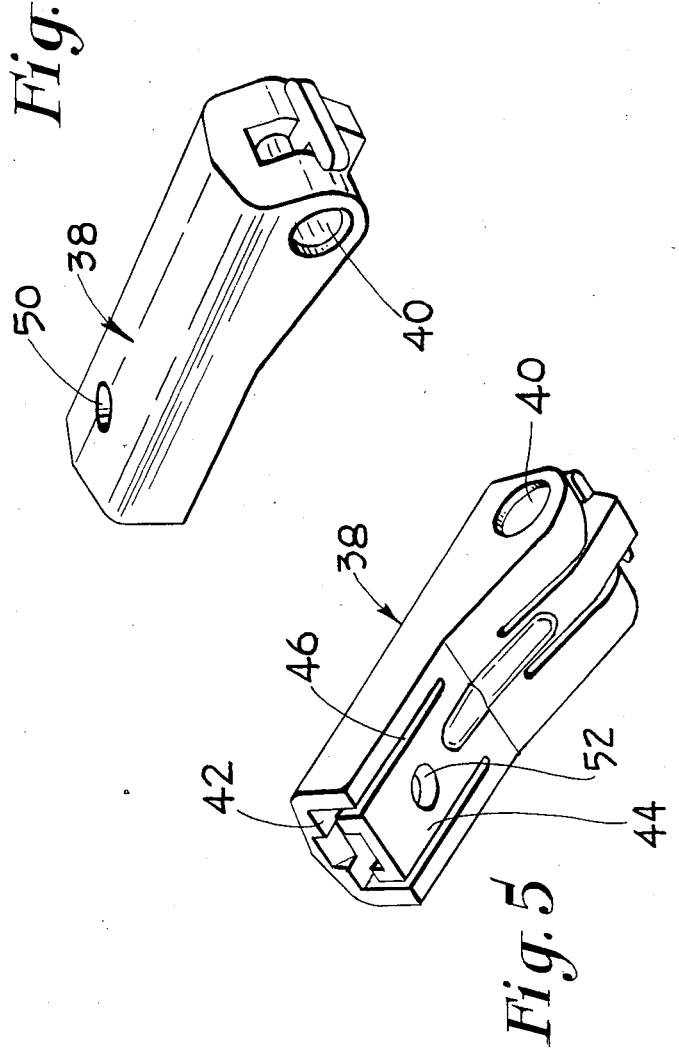

WIPER EQUIPMENT

BACKGROUND OF THE INVENTION

This invention relates principally to wiper equipment for motor vehicles and more particularly to a wiper angular typed arm for either right or left hand use.

Because of the large number of models of vehicles currently in use, manufacturers of wiper equipment, and stockists of spare components, have the problem of reducing, as far as possible, the number of alternative designs of components which have to be made and stocked.

With such designs of wiper arms, it has been the practice for many years to manufacture separate left-hand and right-hand versions. Longitudinally adjustable wiper arms are known and widely used. An example of these is shown in Smithers et al, U.S. Pat. No. 3,405,420 issued Oct. 15, 1968 and assigned to tne assignee of the present invention. This discloses a longitudinal adjustment similar to the longitudinal adjustment herein shown and described. However it lacks the right or left hand versions and discloses a straight arm extension. This does not provide an ideal wipe pattern in all cases. Nesson, U.S. Pat. No. 2,528,283 issued Oct. 31, 1950 discloses a longitudinal arm extension with an angularly adjustable lip which can provide the right or left handedness required. However, the adjustable tip may become displaced during use by wear or inadvertent failure to sufficiently tighten the positioning screw.

SUMMARY OF THE INVENTION

According to the present invention, in a wiper arm of the kind mentioned above, the inner end of the bar portion can be removed from the retainer portion, rotated through a half turn about the longitudinal center line of the inner end, and reassembled with the retainer portion and detachably secured thereto, and the arm termination is detachably securable to the outer end of the bar portion, and can be removed from the outer end, rotated through a half turn about the longitudinal center line of the outer end, and reassembled with the outer end and detachably secured thereto.

If desired, the fact that the inner end of the bar portion can be removed from the retainer portion can be combined with the feature that the longitudinal portion is adjustable relatively to the retainer portion, so that the overall length of the wiper arm can be adjusted for different vehicles, with securing means being provided to retain the bar portion in alternative adjusted positions.

The primary object of the present invention is to provide an improved stable wiper arm which obviates the necessity for manufacturing a right and left hand version.

Another object of the invention is to provide a wiper arm which can readily be converted from a right hand version to a left hand version and vice versa.

A further object of the invention is to provide an adjustable wiper arm construction which eliminates the possibility of inadvertent misadjustment of the angle at the outer end when adapting the arm to use.

Other objects of the invention will be apparent from the following detailed description taken in accordance with the accompanying drawings.

BRIEF DESCRIPTION OF THE DRAWINGS

FIG. 1 is a view of the wiper arm from below;
FIG. 2 is a section of the wiper arm on the line II—II in FIG. 1;
FIG. 3 is a perspective view of the bar portion; and
FIGS. 4 and 5 are perspective views, on a considerably larger scale, of the arm termination, seen from the above and below respectively.

DETAILED DESCRIPTION

As shown in FIG. 2, an inner retainer portion 2 of the wiper arm is pivoted about a transverse axis 4 on an arm head 6. In the arm head, there is a socket 8 which can be fitted onto a knurled end of a wiper operating shaft, shown in phantom, the arm head being retained in position on the wiper operating shaft by a spring latch 10.

The retainer portion 2 is made of bent sheet metal, of inverted channel section, tapering in size from left to right as seen in FIG. 2. At the right-hand end, the flanges of the inverted channel are bent towards one another at 12, so as to form a guide for telescopically receiving a bar portion 14.

The bar portion 14 is made of bar material of uniform generally rectangular transverse cross-section, and at a position near to the right-hand end of the bar portion (as seen in FIGS. 1, 2 and 3) there is a bend 16 through about 10° in the plane of the width of the bar, this plane, in the assembled condition, being substantially parallel to the transverse axis 4, as can be seen particularly from FIG. 2.

In both wider faces of the bar portion 14 there are keeper means in the form of a series of parallel, equally-spaced, transverse grooves or recesses constituting keeper elements 18. The fact that there is such a series in both faces is shown particularly in FIG. 2. In the assembled condition, the bar portion 14 is located relatively to the retainer portion 2 by means of a latch member or latch means 20. This member 20 is made by bending sheet metal, and is essentially of channel section, fitting between the flanges of the retainer portion 2 adjacent to the bent-in portions 12. The latch member 20 is pivoted to the retainer portion on a transverse pin 22 to act as a lever. To the left (in FIG. 2) of the pin 22, there is a window 24 in the web of the member 20, and material struck upwards from that window constitutes a lug 26, the tip of which can co-operate with any one of the grooves, as shown in FIG. 2.

A coil tension spring 28, made of resilient wire, has two longitudinal end portions, terminating in hooks 30 and 32. The hook 30 engages around a transverse pin 34 in the arm head, while the hook 32 engages in the window 24 in the latch member. As a consequence, the spring 28 simultaneously performs two functions: one is to urge the wiper arm towards a windscreen to be wiped; the other is to urge the latch member 20 to a pivotal position in which the lug 26 interengages with a selected notch 18 in the bar portion 14. In order to release the lug 26 from the bar portion 14, a user can exert upward pressure on the right-hand extension 36 of the web on the latch member. This enables the bar portion 14 to be adjusted longitudinally, or alternatively removed.

The final component of the wiper arm is an arm termination 38, which is a plastics moulding, and which is shown on a larger scale in FIGS. 4 and 5. In the right-hand end of the arm termination (as seen in FIGS. 2, 4 and 5) there is a transverse bore 40, intended to receive a transverse lateral pin on a wiper blade (not shown) and snap engage therewith in any suitable manner. The details of the connection between the arm termination and the wiper blade are not relevant to the present invention.

In the left-hand end of the arm termination (particularly as seen in FIGS. 2 and 5), there is a longitudinal socket 42, having a cross-section substantially the same as that of the bar portion 14. The lower wall of this socket is constituted by a tongue portion 44 defined by narrow slots 46, so that the tongue portion 44 can be deflected resiliently downwards in order to increase temporarily the depth of the socket 42.

The right-hand end of the bar portion 14, (i.e., to the right of the bend 16) is straight, and has on one wide face a cylindrical protuberance 48. This is made by displacing material of the bar portion, so that in the opposite side face there is a depression.

If the bar portion 14 is used in the attitude as shown in FIG. 3, i.e., with the protuberance 48 upwards, then it can be assembled with the retainer portion 2, and also with the arm termination 38, and the protuberance will snap engage with a hole 50 in the top of the termination 38. The result will be a wiper arm in which, as seen from above, the termination is inclined to the right relative to the remainder of the arm. If, now, the inner end of the bar portion is removed from the retainer portion, rotated through a half turn about the longitudinal center line of the inner end, and reassembled with the retainer portion, and detachably secured by the latch member 20, and the arm termination is removed from the outer end of the bar portion, rotated through a half turn about the longitudinal center line of the outer end, and reassembled with the outer end, then one will arrive at the arrangement shown in FIG. 1 in which, if the wiper arm is viewed from above, the arm termination is inclined to the left relative to the remainder of the wiper arm. In this latter condition, the protuberance 48 extends downwards, and snap engages with a hole 52 in the tongue portion 44 of the arm termination 38 (FIG. 1).

It will be seen, therefore, that from the single set of components described, it is possible to produce both right-hand and left-hand wiper arms. The total number of components and interconnections is small, so that the cost of manufacturing the components is not excessive, the assembly procedure is straightforward, and there is no excessive play between the components.

Although a certain specific embodiment of the invention has been shown and described for the purpose of illustration, it will be apparent that in accordance with the broader aspects of the invention, other embodiments are possible within the scope of the invention. For example other and different latch and keeper means may be employed; the angle of head of the outer end of the bar portion may vary and may include compound bends and other and different spring urging means may be employed. It is to be understokod, therefore, that the invention is not limited to the specific arrangement shown and described, but in its broadest aspects it includes all equivalent embodiments and modifications which come within the scope of the invention.

What is claimed is:

1. A wiper arm comprising an inner retainer portion pivotable about a transverse axis on an arm head, an outer bar portion having an inner end telescopically engaging the distal end portion of said retainer portion detachably secured thereto in one position and in another position rotated through a half turn about its longitudinal center line, and having an outer end arm termination means for enabling connection to be made to a wiper blade, the bar portion being formed with at least one bend in a plane substantially parallel to the transverse axis so that the longitudinal center line of the outer end of the bar portion is not aligned with the longitudinal center line of the inner end of the bar portion; which includes cooperating latch means and keeper means on said outer bar portion for detachably and removably retaining the inner end of said outer bar portion in operative connection with said retainer portion in a position wherein said outer end of said bar portion extends at one fixed angular attitude and in another position rotated through a half turn about the longitudinal center line of the inner end wherein said outer end of the bar portion extends in another equal fixed angular attitude in an opposite direction.

2. A wiper arm according to claim 1 wherein said arm termination means includes a connector for detachable securement at the free end of the outer bar in one position and in a second position rotated through a half turn about the longitudinal center line of the outer end.

3. A wiper arm according to claim 2 wherein said keeper comprises latch engageable abutments positioned in accessible relationship to the latch means from opposite surfaces of said bar whereby the outer end of the bar portion may be removed, rotated through a half turn about the longitudinal center line of the inner end and reassembled with the retainer portion and detachably secured thereto.

4. A wiper arm according to claim 1 wherein said keeper means includes a series of longitudinally spaced elements for retaining the bar portion at longitudinally spaced positions therealong whereby the position of the bar portion is adjustable relative to the retainer portion.

5. A wiper arm according to claim 1 in which the outer end of the bar portion is of generally rectangular transverse cross-section, one pair of faces thus being wider than the other pair of faces, the outer end of the bar portion having a bend in a plane parallel to the wider pair of faces and also having a protuberance on only one of the wider pair of faces between the bend and the extremity of the outer end of the bar portion for snap engagement with a corresponding hole in the arm termination, with the arm termination having a socket for receiving the outer end of the bar portion and also having one said hole in each of two opposed walls of the socket.

6. A wiper arm according to claim 4 wherein said keeper means comprises a series of longitudinally spaced recesses on the inner end of each of the wider faces of said bar portion and said latch means comprises a spring urged lever having a cooperating lug positioned to engage said recess when the recess is adjustably positioned to overlie said lug.

* * * * *